US012779686B2

(12) United States Patent
Watanabe et al.

(10) Patent No.: US 12,779,686 B2
(45) Date of Patent: Nov. 3, 2026

(54) ROBOT CONTROL WITH PATH GENERATION

(71) Applicant: KABUSHIKI KAISHA YASKAWA DENKI, Kitakyushu (JP)

(72) Inventors: Wataru Watanabe, Fukuoka (JP); Takahiro Maeda, Fukuoka (JP); Yuta Arita, Fukuoka (JP); Motoharu Maruno, Fukuoka (JP)

( * ) Notice: Subject to any disclaimer, the term of this patent is extended or adjusted under 35 U.S.C. 154(b) by 37 days.

(21) Appl. No.: 19/035,868

(22) Filed: Jan. 24, 2025

(65) Prior Publication Data

US 2025/0242495 A1 Jul. 31, 2025

(30) Foreign Application Priority Data

Jan. 26, 2024 (JP) ................................ 2024-010395

(51) Int. Cl.
*B25J 9/16* (2006.01)
*B25J 13/08* (2006.01)

(52) U.S. Cl.
CPC ........... *B25J 9/1666* (2013.01); *B25J 13/088* (2013.01)

(58) Field of Classification Search
CPC ...... B25J 9/1666; B25J 13/088; B25J 9/1607; B25J 9/1612; B25J 9/1664; B25J 9/1602
See application file for complete search history.

(56) References Cited

U.S. PATENT DOCUMENTS

2007/0013336 A1 1/2007 Nowlin et al.
2012/0165982 A1* 6/2012 Kim ...................... B25J 9/1664 700/262
2020/0316779 A1* 10/2020 Truebenbach ......... B25J 9/1607
2020/0338730 A1* 10/2020 Yamauchi .............. B25J 9/1671
2021/0001483 A1* 1/2021 Milenkovic ............ B25J 9/1666
2021/0154846 A1 5/2021 Watanabe
2022/0314443 A1* 10/2022 Gienger ................. B25J 9/1664
2023/0110897 A1* 4/2023 Kansky .................. B25J 9/1664 700/253
2023/0249347 A1 8/2023 Maeda et al.
2024/0326245 A1* 10/2024 Suzumura .............. B25J 9/1661
2024/0383138 A1* 11/2024 Hamasaki .................. B25J 5/00

FOREIGN PATENT DOCUMENTS

CN 104758055 3/2019
CN 116572230 8/2023
JP 2000-020117 1/2000
JP 6792184 11/2020

OTHER PUBLICATIONS

Jiangping Wang et al., "Inverse kinematics-based motion planning for dual-arm robot with orientation constraints", International Journal of Advanced Robotic Systems, vol. 16, No. 2, Mar. 1, 2019, p. 1-p. 14.
Extended Search Report in corresponding European Application No. 25153584.5, dated Jun. 26, 2025.

* cited by examiner

*Primary Examiner* — Adam R Mott
*Assistant Examiner* — Heather J Keniry
(74) *Attorney, Agent, or Firm* — SHIPWAY IP

(57) ABSTRACT

A robot system includes: a robot having a multi-joint arm connected to an end-effector; and circuitry configured to move the end effector by: generating a motion path in a joint angle space having dimensions respectively corresponding to joint angles of the multi-joint arm; modifying the motion path in the joint angle space to reduce a change of posture of the end-effector; and controlling the robot to move the end-effector along the modified motion path.

19 Claims, 14 Drawing Sheets

*Fig.3*

```
MoveJ (·················)
MoveJ (·················)
MoveJ (·················)
MoveJ (·················)
MoveJ (·················)
MoveJ (·················)
MoveJ (·················)
MoveJ (·················)
          ⋮
```

*Fig.4*

```
C11 → MoveL (••••••••••••••••)
C12 → MoveS (••••••••••••••••)
C13 → MoveL (••••••••••••••••)
C14 → MoveL (••••••••••••••••)
C15 → MoveAuto (••••••••••••••••, Range Information)
C16 → MoveL (••••••••••••••••)
C17 → MoveS (••••••••••••••••)
C18 → MoveJ (••••••••••••••••)
C19 → MoveAuto (••••••••••••••••, Range Information)
        ⋮
```

ROBOT CONTROL WITH PATH GENERATION

CROSS-REFERENCE TO RELATED APPLICATIONS

This application is based upon and claims the benefit of priority from Japanese Patent Application No. 2024-010395, filed on Jan. 26, 2024, the entire contents of which are incorporated herein by reference.

BACKGROUND

Field

The present disclosure relates to a robot system and a control method.

Description of the Related Art

Japanese Unexamined Patent Application Publication No. 2000-20117 discloses a method for planning a motion path of a robot that does not interfere with obstacles in a work environment when start and goal configurations of the robot are given, by utilizing a geometric model means on a computer that describes the geometric shapes of the robot and the work environment and their arrangement, and an interference checking means on the computer that checks for interference between the models.

SUMMARY

Disclosed herein is a robot system. The robot system may include: a robot having a multi-joint arm connected to an end-effector; and circuitry configured to move the end effector by: generating a motion path in a joint angle space having dimensions respectively corresponding to joint angles of the multi-joint arm; modifying the motion path in the joint angle space to reduce a change of posture of the end-effector; and controlling the robot to move the end-effector along the modified motion path.

Additionally, a control method is disclosed herein. The method may include: generating a motion path in a joint angle space having dimensions respectively corresponding to joint angles of the multi-joint arm; and modifying the motion path in the joint angle space to reduce a change of posture of the end-effector; and controlling the robot to move the end-effector along the modified motion path.

BRIEF DESCRIPTION OF THE DRAWINGS

FIG. 3 is an example schematic diagram illustrating a plurality of motion commands representing a motion path in a joint angle space.

FIG. 4 is an example schematic diagram illustrating a plurality of motion commands.

DETAILED DESCRIPTION

In the following description, with reference to the drawings, the same reference numbers are assigned to the same components or to similar components having the same function, and overlapping description is omitted.

[Robot System]

Figure 1:
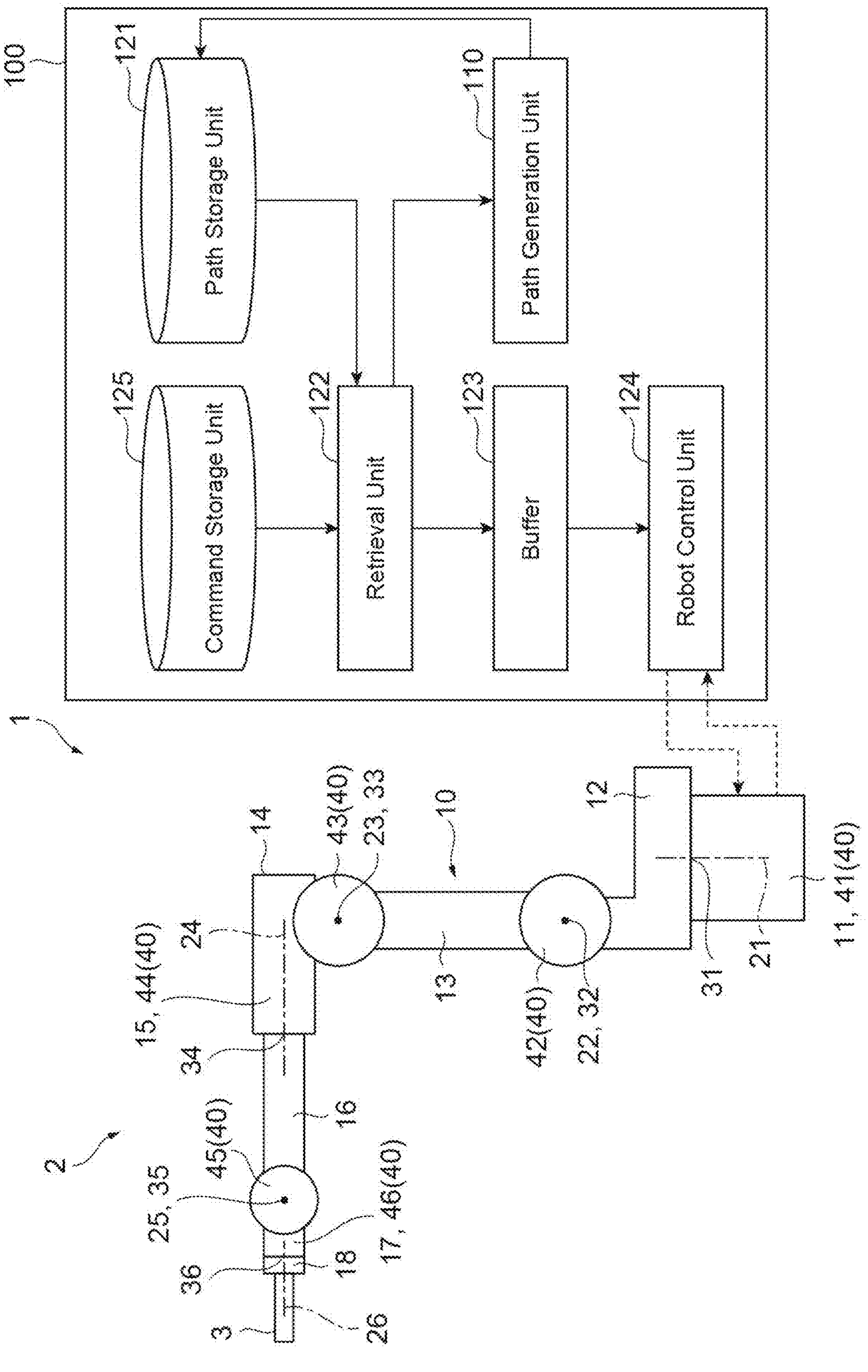
FIG. 1 is an example schematic diagram illustrating the configuration of a robot system.

The robot system 1 shown in FIG. 1 is a system that causes the robot 2 to perform a task on a workpiece. Examples of tasks on the workpiece include conveying the workpiece, machining the workpiece, assembling the workpiece, and the like. Examples of machining the workpiece include grinding the workpiece, polishing the workpiece, and the like. Examples of assembling the workpiece include fastening multiple parts (workpiece parts) to each other by bolt fastening, joining multiple parts by welding, and the like.

The robot system 1 includes a robot 2 and a control device 100. The robot 2 is, for example, an industrial vertical articulated robot and includes an end-effector 3 and a multi-joint arm 10.

The end-effector 3 corresponds to a tip of the robot 2 and acts on the workpiece. Examples of the end-effector 3 include a suction nozzle that holds the workpiece, a hand that grips the workpiece, a grinding tool that grinds the workpiece, a polishing tool that polishes the workpiece, a screw tightening tool (e.g., driver or wrench) that performs screw tightening (e.g., tightening of bolts), a welding gun that performs spot welding, a welding torch that performs arc welding, a painting gun that performs painting, and the like, but are not limited to these examples.

The multi-joint arm 10 changes the position of the end-effector 3 by the operation of multiple joints. Changing the position of the end-effector 3 includes changing the posture of the end-effector 3. For example, changing the position of the end-effector 3 includes changing the coordinates of the end-effector 3 (e.g., the coordinates of the tip of the end-effector 3) in the Cartesian space and rotating the end-effector 3 around each coordinate axis.

For example, as shown in FIG. 1, the multi-joint arm 10 includes a base portion 11, a swivel portion 12, a first arm 13, a second arm 14, a third arm 17, an end portion 18, and multiple motors 40. The base portion 11 is installed on, for example, a floor of a work area. The base portion 11 may be installed on a moving body such as an automated guided vehicle that moves within the work area.

The swivel portion 12 is provided on the base portion 11 to be rotatable around a vertical axis 21. The first arm 13 is connected to the base portion 11 to be swingable around an axis 22 intersecting (e.g., orthogonally) the axis 21 and extends in a direction away from the axis 22. The term "intersecting" includes being in a twisted relationship with each other, such as spatial intersection. The same applies hereinafter.

The second arm 14 is connected to the end of the swivel portion 12 to be swingable around an axis 23 parallel to the axis 22. The second arm 14 includes an arm base portion 15 and an arm end portion 16. The arm base portion 15 extends in a direction away from the axis 23. The second arm 14 is connected to the end of the arm base portion 15 to be rotatable around an axis 24 along the central axis of the arm base portion 15 and further extends from the arm base portion 15 along the axis 24.

The third arm 17 is connected to the end of the arm end portion 16 to be swingable around an axis 25 intersecting (e.g., orthogonally) the axis 24 and extends in a direction away from the axis 25. The end portion 18 is connected to the third arm 17 to be rotatable around an axis 26 along the central axis of the third arm 17. The end-effector 3 is attached to the end portion 18.

Therefore, the multi-joint arm 10 includes: a joint 31 that allows the swivel portion 12 to rotate around the axis 21 with respect to the base portion 11; a joint 32 that allows the first arm 13 to swing around the axis 22 with respect to the swivel portion 12; a joint 33 that allows the arm base portion 15 to swing around the axis 23 with respect to the first arm 13; a joint 34 that allows the arm end portion 16 to rotate around the axis 24 with respect to the arm base portion 15; a joint 35 that allows the third arm 17 to swing around the axis 25 with respect to the arm end portion 16; and a joint 36 that allows the end portion 18 to rotate around the axis 26 with respect to the third arm 17.

The multiple motors 40 respectively operate the multiple joints of the multi-joint arm 10. For example, the multi-joint arm 10 includes motors 41, 42, 43, 44, 45, and 46 as the multiple motors 40. The motors 41, 42, 43, 44, 45, and 46 respectively operate the six-axis joints 31, 32, 33, 34, 35, and 36 to change the position and posture of the end portion 18. As a result, the position and posture of the end-effector 3 are changed along with the position and posture of the end portion 18.

For example, the motor 41 drives the joint 31 to rotate the swivel portion 12 around the axis 21. The motor 42 drives the joint 32 to swing the first arm 13 around the axis 22. The motor 43 drives the joint 33 to swing the arm base portion 15 around the axis 23. The motor 44 drives the joint 34 to rotate the arm end portion 16 around the axis 24. The motor 45 drives the joint 35 to swing the third arm 17 around the axis 25. The motor 46 drives the joint 36 to rotate the end portion 18 around the axis 26.

Each of the motors 41, 42, 43, 44, 45, and 46 is, for example, an electric motor. Each of the motors 41, 42, 43, 44, 45, and 46 may directly drive its target or may drive it via transmission elements such as reducers. Hereinafter, when the joints 31, 32, 33, 34, 35, and 36 may not be distinguished with each other, they are collectively referred to as the multiple joints 30, and each of them is referred to as a joint 30. Similarly, when the motors 41, 42, 43, 44, 45, and 46 may not be distinguished with each other, they are collectively referred to as the multiple motors 40, and each of them is referred to as a motor 40.

The configuration of the multi-joint arm 10 described above is merely an example and can be changed as long as it can change the position and posture of the end-effector 3. For example, the multi-joint arm 10 may be a redundant robot obtained by adding one or more redundant axes to the six-axis joints described above. Also, the multi-joint arm 10 may be a SCARA robot or a parallel link robot.

The control device 100 controls the multi-joint arm 10. For example, the control device 100 executes generating a motion path to move the end-effector 3 and operating the robot 2 so that the end-effector 3 moves along the generated motion path.

For example, when the motion start position (the position and posture of the end-effector 3 at the start of motion) and the motion end position (the position and posture of the end-effector 3 at the end of motion) are determined but the motion path from the motion start position to the motion end position is not uniquely determined, the control device 100 generates the motion path.

Figure 2:
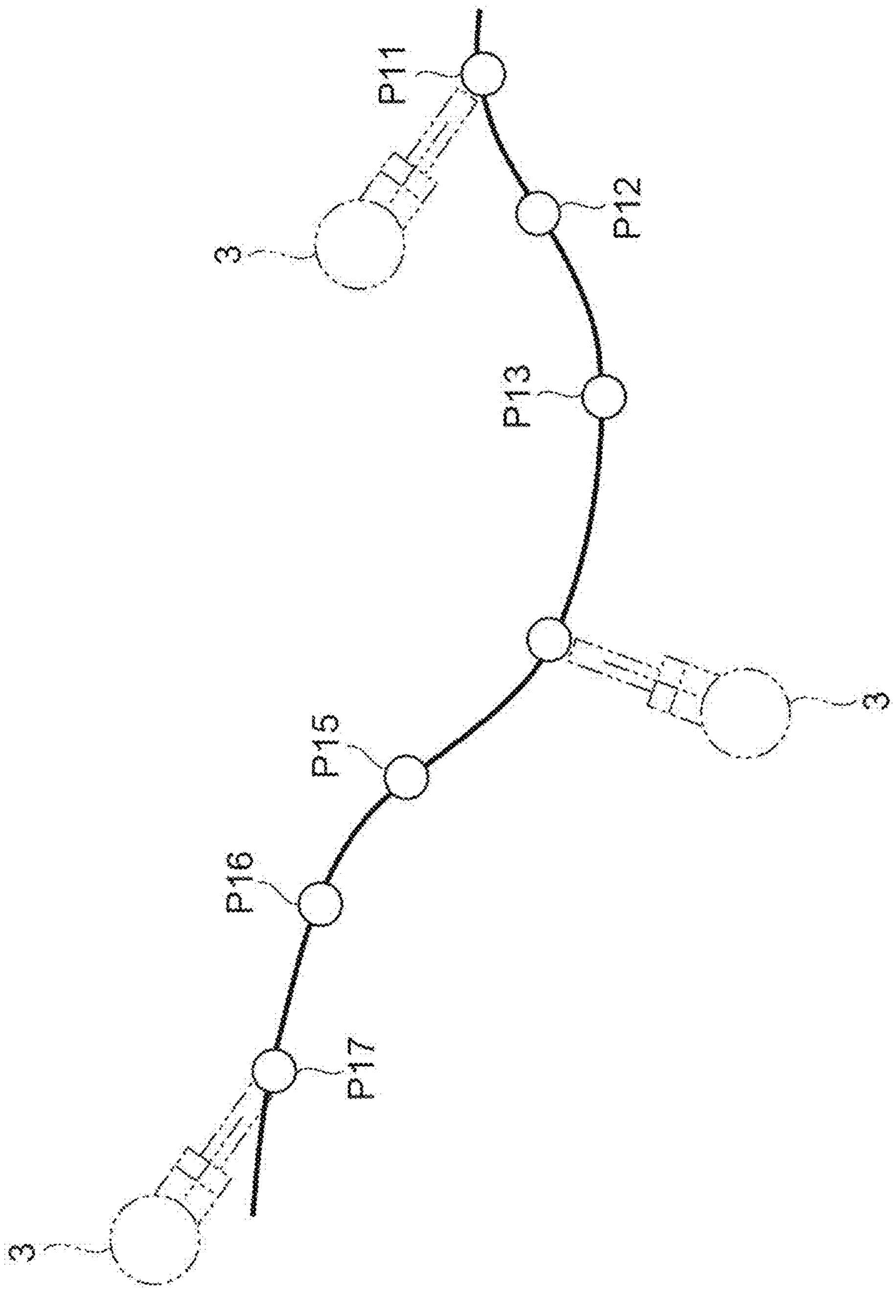
FIG. 2 is an example schematic diagram illustrating a motion path.

The motion path is a transition of the position and posture of the end-effector 3 from the motion start position to the motion end position. For example, as shown in FIG. 2, the control device 100 generates a motion path represented by a plurality of via positions P11 to P17 in time series. The number of via points in FIG. 2 is merely an example and not limited thereto.

Each of the via positions P11 to P17 represents the position and posture of the end-effector 3. The first via position P11 corresponds to the motion start position, and the last via position P17 corresponds to the motion end position. The motion path from the via position P11 to the via position P17 is determined by the via positions P12 to P17 located between the via position P11 and the via position P17.

The control device 100 may generate the motion path from the motion start position to the motion end position based on surrounding environment information. For example, the control device 100 generates the motion path so that the robot 2 does not collide with surrounding objects based on the surrounding environment information.

The control device 100 may generate a motion path that directly represents the transition of the position and posture of the end-effector 3 in the Cartesian space, or may generate a motion path that indirectly represents the transition of the position and posture of the end-effector 3 in the joint angle space. The joint angle space is a space represented by coordinate axes of same number (e.g., six) as the multiple joints 30. Each coordinate axis corresponds to one of the multiple joints 30. Each coordinate axis represents the angle of the corresponding joint 30.

According to the coordinates in the joint angle space, the position and posture of the end-effector 3 may uniquely calculated by forward kinematics calculation. Therefore, according to the motion path generated in the joint angle space, the transition of the position and posture of the end-effector 3 is indirectly represented. For example, according to the motion path generated in the joint angle space, each of the via positions P11 to P17 in FIG. 2 is indirectly represented by the coordinates in the joint angle space.

According to the method of generating a motion path in the joint angle space, the angles of the multiple joints 30 may be calculated without being constrained by the position and posture of the end-effector 3, so it is easier to distribute the motion among the multiple joints 30 compared to the method of directly generating the motion path of the end-effector 3 using the Cartesian space. Therefore, any of the multiple joints 30 may be prevented from performing an excessive motion and to generate the motion path of the robot 2 quickly with reliability. However, there is a possibility that the posture of the end-effector 3 may change greatly during the operation of the robot 2 along the motion path. For example, in FIG. 2, the posture of the end-effector 3 at the via position P14 is significantly different from the posture of the end-effector 3 at the via positions P11 and P17.

In a situation where the posture of the end-effector 3 may not be changed, if the posture of the end-effector 3 changes greatly, energy may be consumed. Also, for example, when the robot 2 is used to convey a container containing liquid, there may be cases where a great change in the posture of the end-effector 3 cannot be allowed.

Therefore, the control device 100 is configured to generate the motion path in the joint angle space while suppressing the posture change of the end-effector 3 when moving along the motion path. For example, the control device 100 may be configured to: generate the motion path in the joint angle space, so that a change of posture of the end-effector moving along the motion path is reduced; and controlling the robot to move the end-effector along the generated motion path. For example, the control device 100 may be configured to move the end-effector 3 by: generating a motion path in the joint angle space; modifying the motion path in the joint angle space to reduce a change of posture of the end-effector 3; and controlling the robot to move the end-effector along the modified motion path. The change in the posture of the end-effector 3 may be suppressed while preventing any of the multiple joints 30 from performing an excessive motion. Therefore, the motion path of the robot 2 with reliability may quickly be generated.

Here, the end-effector 3 moving along the motion path generated in the joint angle space means that the end-effector 3 moves along the transition of the position and posture of the end-effector 3 indirectly obtained based on the motion path.

For example, as shown in FIG. 1, the control device 100 includes functional components (hereinafter referred to as "functional blocks") such as a path generation unit 110, a path storage unit 121, a calling unit 122, a buffer 123, and a robot control unit 124. The path generation unit 110 is configured to generate the motion path in the joint angle space of the multi-joint arm 10 while suppressing the posture change of the end-effector 3 when moving along the motion path. An example of the motion path generation method will be described later. For example, the path generation unit 110 is configured to generate a plurality of motion commands representing the motion path in the joint angle space and stores them in the path storage unit 121.

FIG. 3 is a schematic diagram illustrating a plurality of motion commands representing a generated motion path. One line in FIG. 3 corresponds to one motion command. In each motion command, "Move" followed by "J" represents a motion command in the joint angle space, and numerical values in parentheses represent target angles of each of the multiple joints 30. Each motion command specifies that each of the multiple joints 30 changes linearly from a starting point (e.g., the target angle of the immediately preceding motion command) to an end point (the target angle in parentheses).

Returning to FIG. 1, the calling unit 122 is configured to sequentially call the plurality of motion commands from the path storage unit 121 and temporarily stores them in the buffer 123. The plurality of motion commands are sequentially fetched and temporarily stored in the buffer 123.

The robot control unit 124 is configured to operate the robot 2 so that the end-effector 3 moves along the generated motion path. For example, the robot control unit 124 is configured to repeat the following operations 1 to 5 at a predetermined control cycle.

Operation 1) Generate (update) a velocity pattern (time variation of velocity) including acceleration and deceleration based on the plurality of motion commands stored in the buffer 123.

Operation 2) Calculate the target positions (target angles) of the motors 41, 42, 43, 44, 45, and 46 for each control cycle.

Operation 3) Acquire the current positions (current angles) of the motors 41, 42, 43, 44, 45, and 46.

Operation 4) Calculate deviations between the target positions and the current positions.

Operation 5) Calculate drive power to reduce each of the deviations and supply the calculated drive power to each of the motors 41, 42, 43, 44, 45, and 46.

The path generation unit 110 may generate at least a part of the motion path while the robot control unit 124 is operating the robot 2. By generating the motion path at a timing close to the timing when the robot 2 actually operates, the motion path with reliability may be generated by reflecting changes in the surrounding environment. Operating the robot 2 by the robot control unit 124 includes maintaining a constant position and posture of the robot 2 by supplying drive power. For example, when the above-mentioned velocity pattern includes a period of zero velocity, the robot control unit 124 supplies drive power to maintain a constant position and posture of the robot 2. In addition, when there are no unexecuted motion commands in the buffer 123 due to a delay in path generation, the robot control unit 124 supplies drive power to maintain a constant position and posture of the robot 2.

The path generation unit 110 may generate at least a part of the motion path while the position and posture of the robot 2 are changing due to the drive power supplied by the robot control unit 124. By reducing the timing in which the operation of the robot 2 is interrupted to wait for the generation of the motion path, the robot 2 can be operated efficiently.

The control device 100 may further include a command storage unit 125. The command storage unit 125 stores one or more motion commands generated in advance, separately from the motion commands generated by the path generation unit 110. For example, the command storage unit 125 stores a plurality of motion commands in time series. The plurality of motion commands stored in the command storage unit 125 include move commands and auto commands, and are sequentially called by the calling unit 122.

The move command includes a target position (e.g., target position and target posture of the end-effector 3, or target angles of the multiple joints 30) and path generation conditions to the target position. The path generation conditions are conditions that uniquely determine the motion path from the starting point to the end point. Examples of the path generation conditions include the following:

Condition 1) In the Cartesian space, move the end-effector 3 along a linear motion path from the starting point to the end point.

Condition 2) In the Cartesian space, move the end-effector 3 along an S-shaped motion path from the starting point to the end point.

Condition 3) In the joint angle space, move the end-effector 3 along a linear motion path from the starting point to the end point.

In the motion commands in FIG. 3, "J" after "Move" represents Condition 3. Condition 3 means that the angles of each of the multiple joints 30 change linearly from the starting point to the end point. According to Condition 3, the motion path of the end-effector 3 in the Cartesian space may not be linear.

The auto command includes a target position but does not include path generation conditions. As mentioned above, the "path generation conditions" here are conditions that uniquely determine the motion path from the starting point to the end point of the motion path. The auto command does not uniquely determine the motion path but may include conditions that limit the range of motion path generation. To operate the robot 2 based on the auto command, which does not include the path generation conditions that uniquely determine the motion path, a motion path may be generated to the target position included in the auto command. Therefore, when the auto command is called, the path generation unit 110 generates an air cut path as the motion path, which moves the end-effector 3 to the target position of the auto command. The air cut path is a motion path that moves the end-effector 3 without contacting surrounding objects or the workpiece.

Since the motion path of the robot 2 can be generated quickly with reliability, even if the motion path of the robot 2 is generated after the auto command is called, the increase in the period during which the operation of the robot 2 is interrupted to wait for the generation of the motion path can be suppressed. By generating the motion path of the robot 2 after the auto command is called, the motion path is generated at a timing close to the timing when the robot 2 actually operates, the motion path adapted to changes in the surrounding environment may be generated with reliability.

For example, the calling unit 122 sequentially calls the plurality of motion commands from the command storage unit 125 and temporarily stores a called motion command in the buffer 123 if the called motion command is the move command. If the called motion command is an auto command, the calling unit 122 notifies the path generation unit 110 of the target position of the auto command and the target position of the motion command called immediately before the auto command (hereinafter referred to as the "previous target position"). The path generation unit 110 generates an air cut path from the previous target position to the target position of the auto command and stores the plurality of motion commands representing the air cut path in the path storage unit 121.

After calling the auto command, the calling unit 122 changes the calling source of the motion commands from the command storage unit 125 to the path storage unit 121. The calling unit 122 sequentially calls the plurality of motion commands from the path storage unit 121 after the path generation unit 110 completes the generation of the motion path, and after calling all the plurality of motion commands stored in the path storage unit 121, the calling unit 122 returns the calling source of the motion commands from the path storage unit 121 to the command storage unit 125.

The auto command may be associated with range information representing an permissible range of posture change of the end-effector 3. The path generation unit 110 may generate the motion path based on the range information corresponding to the called auto command so that the posture change of the end-effector 3 falls within the permissible range represented by the range information. The narrower the permissible range, the greater the computational load to generate the motion path. By associating the permissible range with the auto command, the permissible range may be changed according to the auto command. Therefore, suppressing the posture change of the end-effector 3 and reducing the computational load may be balanced.

FIG. 4 is a schematic diagram illustrating a plurality of motion commands stored in the command storage unit 125. In FIG. 4, a plurality of commands C11 to C19 arranged in time series are shown. Commands C11, C13, C14, and C16 are move commands, and the numerical values in parentheses represent the target position and target posture of the end-effector 3 in the Cartesian space. "L" after "Move" indicates moving the end-effector 3 along a linear motion path from the starting point (e.g., the target position and target posture of the immediately preceding motion command) to the end point (the target position and target posture in parentheses) in the Cartesian space (Condition 1 described above).

Commands C12 and C17 are also move commands, and the numerical values in parentheses represent the target position and target posture of the end-effector 3 in the Cartesian space. In commands C12 and C17, "S" after "Move" indicates moving the end-effector 3 along an S-shaped motion path from the starting point (e.g., the target position and target posture of the immediately preceding motion command) to the end point (the target position and target posture in parentheses) in the Cartesian space (Condition 2 described above).

Command C18 is also a move command, and the target angles of each of the multiple joints 30 in the joint angle space are included in the parentheses. In command C18, similar to the motion commands in FIG. 3, "J" after "Move" indicates moving the end-effector 3 along a linear motion path from the starting point (e.g., the target angles of the immediately preceding motion command) to the end point (the target angles in parentheses) in the joint angle space (Condition 3 described above).

In commands C15 and C19, "Auto" after "Move" indicates that the command is an auto command. The parentheses in commands C15 and C19 include the target position and target posture of the end-effector 3 in the Cartesian space and the range information representing the permissible range of posture change of the end-effector 3.

The calling unit 122 sequentially calls the move commands C11 to C14, which are move commands, and temporarily stores them in the buffer 123. When the auto command C15, which is an auto command, is called, the calling unit 122 notifies the path generation unit 110 of the target position of the command C14 and the target position of the command C15. The path generation unit 110 generates an air cut path from the target position of the command C14 to the target position of the command C15 and stores the plurality of motion commands representing the air cut path in the path storage unit 121.

After calling the command C15, the calling unit 122 changes the calling source of the motion commands from the command storage unit 125 to the path storage unit 121, and after calling all the plurality of motion commands stored in the path storage unit 121 and storing them in the buffer 123, the calling unit 122 returns the calling source of the motion commands from the path storage unit 121 to the command storage unit 125.

Figure 5:
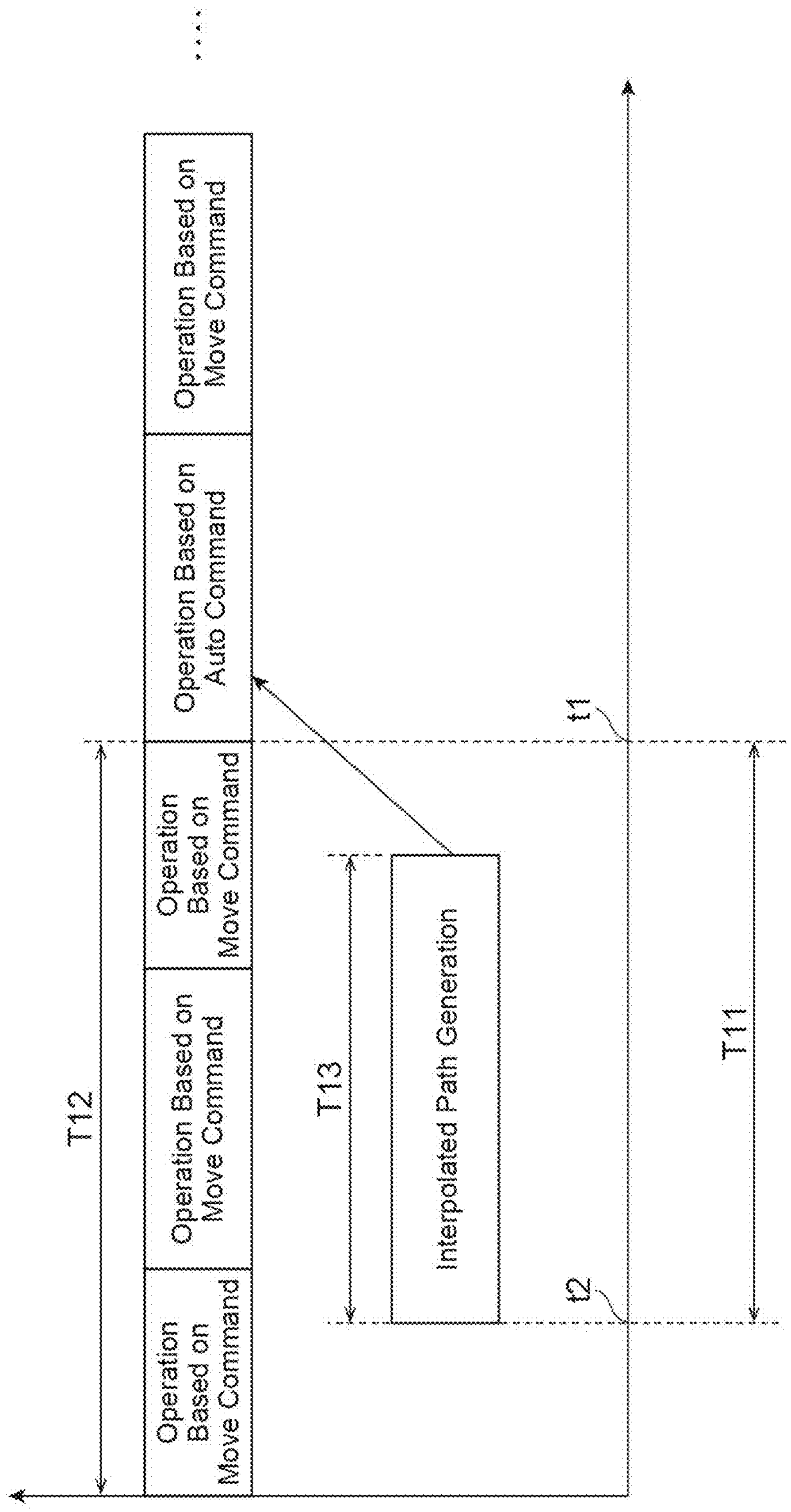
FIG. 5 is an example timing chart illustrating the relationship between the robot operation and the timing of path generation.

FIG. 5 is an example timing chart illustrating the relationship between the operation period of the robot 2 and the generation period of the air cut path by the path generation unit 110, with the horizontal axis representing the passage of time. As shown in FIG. 5, the path generation unit 110 starts generating the air cut path at the start timing t2, which is a generation margin time T11 before the estimated completion timing t1 of the preceding operation (the operation by the immediately preceding move command). The generation margin time T11 is equal to or longer than the generation time T13 of the air cut path. Therefore, if the generation of the air cut path is started at the generation margin time T11 before, the generation of the air cut path may be completed by the estimated completion timing t1 of the preceding operation.

In FIG. 5, the estimated time T12 of the operation corresponding to two or more move commands stored in the command storage unit 125 is longer than the generation margin time T11. Therefore, after the auto command is fetched, there is sufficient time before the preceding operation is completed, and the generation of the air cut path can be started at the start timing t2, which is the generation margin time T11 before the estimated completion timing t1.

If the estimated time T12 is shorter than the generation margin time T11, the start timing t2, which is the generation margin time T11 before the estimated completion timing t1, would be a past time when the auto command is fetched, making it difficult to secure sufficient time to generate the air cut path before the estimated completion timing t1. To avoid such a situation, the calling unit 122 may change the number of commands to be stored in the buffer 123 so that the estimated time T12 becomes longer than the generation margin time T11.

Figure 6:
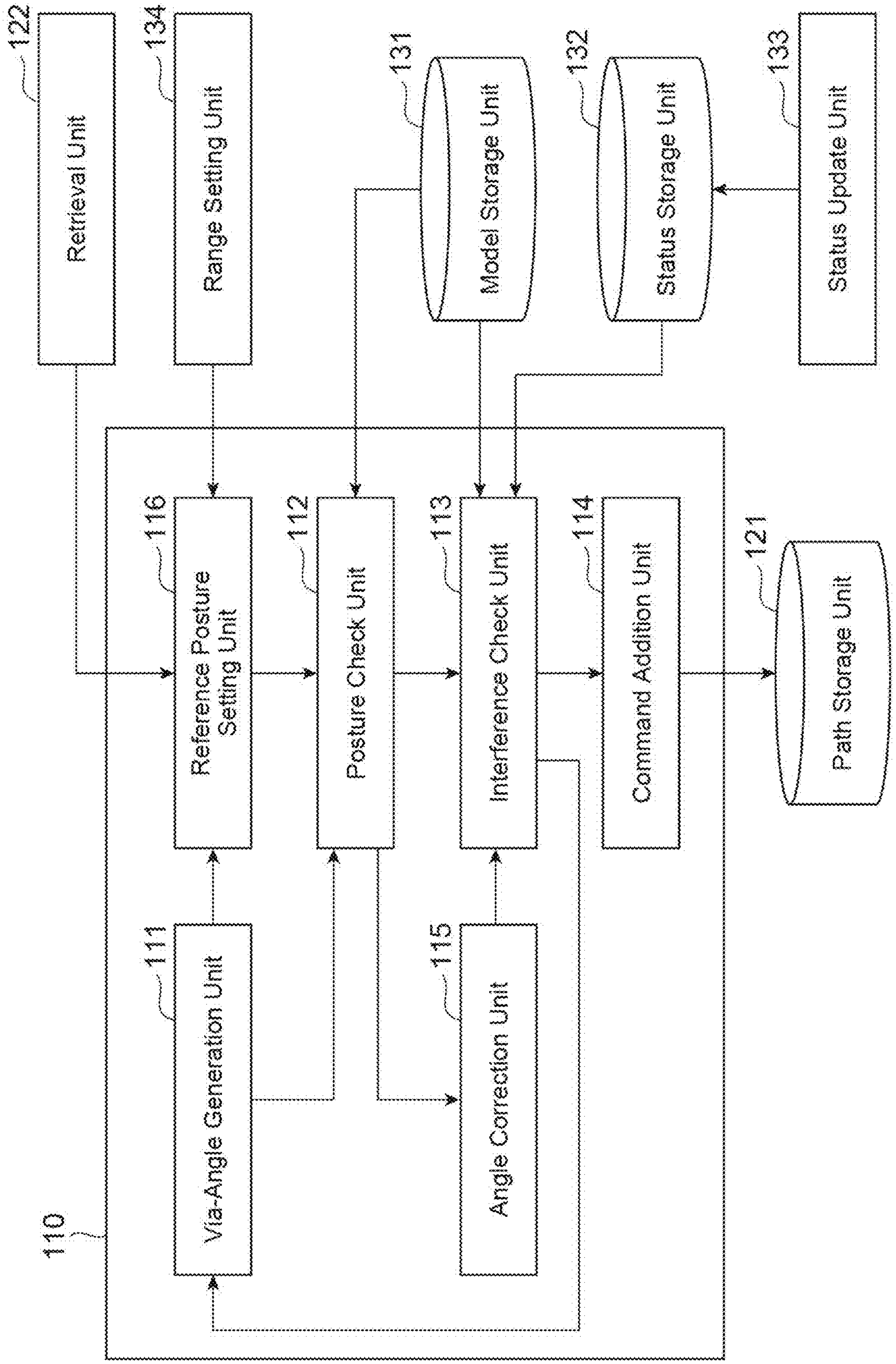
FIG. 6 is an example block diagram illustrating the configuration of the path generation unit.

FIG. 6 is an example block diagram illustrating the configuration of the path generation unit 110. As shown in FIG. 6, the path generation unit 110 includes functional blocks such as a via angle generation unit 111, a posture check unit 112, an interference check unit 113, and a command addition unit 114.

The via angle generation unit 111 is configured to generate a set of joint angles (via angles) through which the joint angles of the multiple joints 30 pass from the joint angles corresponding to the starting point of the air cut path (e.g., the target angles of the immediately preceding motion command) to the joint angles corresponding to the end point of the air cut path (e.g., the target angles corresponding to the target position and target posture of the auto command). For example, the via angle generation unit 111 is configured to generate the via angles by random number generation.

The posture check unit 112 is configured to check whether the posture (posture in the Cartesian space) of the end-effector 3 based on the via angles falls within a predetermined permissible range. For example, the posture check unit 112 calculates the posture of the end-effector 3 based on the via angles by forward kinematics calculation and checks whether the calculated posture falls within the permissible range.

The interference check unit 113 is configured to check whether the robot 2 interferes with surrounding objects at the via angles where the posture of the end-effector 3 falls within the permissible range, based on the models of the robot 2 and the surrounding objects. For example, the control device 100 further includes a model storage unit 131 that stores the models of the robot 2 and the surrounding objects. The models are numerical information specifying the shapes, structures, sizes, and the like of the robot 2 and the surrounding objects.

The interference check unit 113 simulates the posture of the robot 2 corresponding to the via angles in a virtual space based on the via angles and the models of the robot 2 stored in the model storage unit 131, and checks whether the robot 2 interferes with the surrounding objects at the via angles. Interference means that the robot 2 overlaps with the surrounding objects in the virtual space.

The surrounding objects to be interference-checked may include one or more machines whose posture in the Cartesian space changes, such as other robots. Therefore, the control device 100 may further include a status storage unit 132 and a status update unit 133. The status update unit 133 acquires status information of one or more machines from a host controller, an external sensor, or the like, and stores the acquired status information in the status storage unit 132. Examples of the status information include joint angles of other robots. Examples of the external sensors include vision sensors including a camera and an image processing device. The interference check unit 113 may further simulate the operation of the one or more machines based on the models of the one or more machines stored in the model storage unit 131 and the status information stored in the status storage unit 132, and check whether the robot 2 interferes with the one or more machines.

The control device 100 may further be configured to generate the motion path by selecting the set of joint angles in response to determining that the posture of the end-effector 3 based on the set of joint angles falls within the permissible range. The control device 100 may further be configured to generate the motion path by selecting the set of joint angles in response to determining that the posture of the end-effector 3 based on the set of joint angles falls within the permissible range and the robot 2 does not interfere with the surrounding object at the set of joint angles. For example, the command addition unit 114 adds a move command to the path storage unit 121, which has the via angles where the posture of the end-effector 3 falls within the permissible range and where the robot 2 does not interfere with the surrounding objects as the target angles, and has the path generation condition as the above-mentioned Condition 3. The command addition unit 114 also adds a move command corresponding to the end point of the air cut path to the path storage unit 121.

The interference check unit 113 may simulate the operation of the robot 2 by the plurality of move commands added to the path storage unit 121 based on the model of the robot 2 stored in the model storage unit 131 and checks whether the robot 2 interferes with the surrounding objects throughout the entire range from the starting point to the end point of the air cut path. For example, the interference check unit 113 operates the robot 2 in the virtual space by the plurality of motion commands in the path storage unit 121 based on the model of the robot 2 stored in the model storage unit 131 and checks whether the robot 2 interferes with the surrounding objects. If it is determined that the robot 2 interferes with the surrounding objects, the interference check unit 113 requests the via angle generation unit 111 to add via angles for the section where interference occurs. Then, until it is determined that the robot 2 does not interfere with the surrounding objects throughout the entire range from the starting point to the end point of the air cut path, the via angle generation unit 111 generates via angles, the posture check unit 112 performs posture checks, the interference check unit 113 performs interference checks, the command addition unit 114 adds move commands, and the interference check unit 113 performs operation simulations repeatedly. In this way, an air cut path is generated where the robot 2 does not interfere with the surrounding objects throughout the entire range from the starting point to the end point.

The control device 100 may further be configured to: check whether the end-effector 3 based on the set of joint angles falls within the predetermined permissible range, before checking whether the robot 2 interferes with the surrounding object at the set of joint angles; and modify the set of joint angles without checking whether the robot 2 interferes with the surrounding object at the set of joint angles in response to determining that the posture of the end-effector 3 based on the set of joint angles does not fall within the predetermined permissible range. Modifying the set of joint angles may be regenerating a new set of joint angles. Modifying the set of joint angles may be partially correcting the set of joint angles. When it is determined that the posture of the end-effector 3 based on the via angles does not fall within the permissible range, the interference check unit 113 does not check whether the robot 2 interferes with the surrounding objects at that via angles and requests the via angle generation unit 111 to regenerate other via angles. By limiting target of interference check to the via angles where the posture of the end-effector 3 is within the permissible range and suppressing the computational load, the generation of the motion path may be sped up.

The path generation unit 110 may further include an angle correction unit 115. When the posture of the end-effector 3 based on the via angles does not fall within the permissible range, the angle correction unit 115 may correct the via angles so that the posture of the end-effector 3 falls within the permissible range. For example, the angle correction unit 115 may correct the via angles of the target joints 30 (e.g., joints 34, 35, 36) by a simple inverse kinematics calculation targeting any of the multiple joints 30. The interference check unit 113 may perform interference checks with the corrected via angles by the angle correction unit 115. By correcting and utilizing the via angles where the posture of the end-effector 3 did not fall within the permissible range without discarding them, the computational load can be further reduced.

The path generation unit 110 may perform post-processing such as smoothing on the generated air cut path after generation. In the above, an example is shown where the posture check unit 112 performs posture checks on the via angles before the command addition unit 114 adds the move commands to the path storage unit 121 (before generating the air cut path), but the present disclosure is not limited to this. For example, the posture check unit 112 may perform posture checks on the via angles of each move command after generating the air cut path. When the path generation unit 110 performs the above-mentioned post-processing, the posture check unit 112 may perform posture checks on the via angles of each move command after the post-processing.

The path generation unit 110 may suppress the posture change of the end-effector 3 so that it falls within an permissible range including at least one of the posture of the end-effector 3 at the starting point of the air cut path (hereinafter referred to as the "starting posture") and the posture of the end-effector 3 at the end point of the air cut path (hereinafter referred to as the "end posture"). By suppressing the posture change with respect to at least one of the starting posture and the end posture, the posture change of the end-effector can be further suppressed. When the starting posture and the end posture are different, the path generation unit 110 may suppress the posture change so that it falls within an permissible range including both the starting posture and the end posture. By providing a reasonable width to the permissible range, suppressing the posture change of the end-effector and reducing the computational load may be balanced.

For example, the path generation unit 110 may further include a reference posture setting unit 116. The reference posture setting unit 116 is configured to set at least one of the starting posture and the end posture as the reference posture. The posture check unit 112 calculates the permissible range of the posture of the end-effector 3 based on the reference posture and a predetermined permissible change range, and checks whether the posture of the end-effector 3 based on the via angles falls within the calculated permissible range.

For example, when the starting posture is set as the reference posture, the posture check unit 112 calculates the permissible range based on the starting posture and the permissible change range. When the end posture is set as the reference posture, the posture check unit 112 calculates the permissible range based on the end posture and the permissible change range. When both the starting posture and the end posture are set as the reference posture, the posture check unit 112 calculates the permissible range by combining the first permissible range based on the starting posture and the permissible change range, the second permissible range based on the end posture and the permissible change range, and the range from the starting posture to the end posture.

The path generation unit 110 may generate the air cut path so as to suppress the posture change with respect to a posture trajectory determined to gradually change from the posture of the end-effector 3 corresponding to the starting point of the air cut path to the posture of the end-effector 3 corresponding to the end point of the air cut path. The posture of the end-effector may gradually be transitioned from the posture of the end-effector at the starting point to the posture of the end-effector at the end point while suppressing the posture change.

For example, the reference posture setting unit 116 may calculate the reference posture corresponding to the generated via angles as part of the posture trajectory each time the via angle generation unit 111 generates via angles. As an example, the reference posture setting unit 116 may calculate the reference posture corresponding to the generated via angles as the intermediate posture between the preceding and succeeding reference postures. The posture check unit 112 calculates the permissible range of the posture of the end-effector 3 based on the reference posture and the predetermined permissible change range, and checks whether the posture of the end-effector 3 based on the via angles falls within the calculated permissible range.

The control device 100 may further include a range setting unit 134. The range setting unit 134 is configured to set the permissible range of the posture change (the above-mentioned permissible change range) based on input by a user (e.g., input to the user interface 196 described later). The path generation unit 110 suppresses the posture change so that it falls within the permissible change range set by the user. By allowing customization of the permissible change range, usability can be improved.

The range setting unit 134 may acquire the permissible change range represented by a two-axis rotation method based on the input by the user. The path generation unit 110 may calculate the posture change by the two-axis rotation method and generate the air cut path so that the calculated posture change falls within the permissible change range. By enabling intuitive designation of the permissible range, usability can be further improved.

Figure 7:
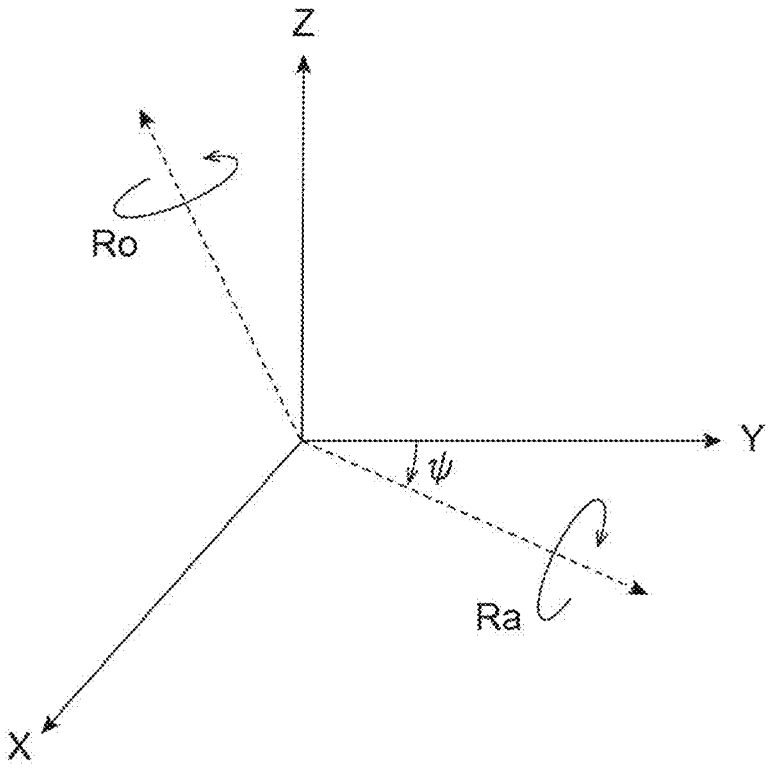
FIG. 7 is a schematic diagram showing an example of calculating posture change by a two-axis rotation method.
Figure 8:
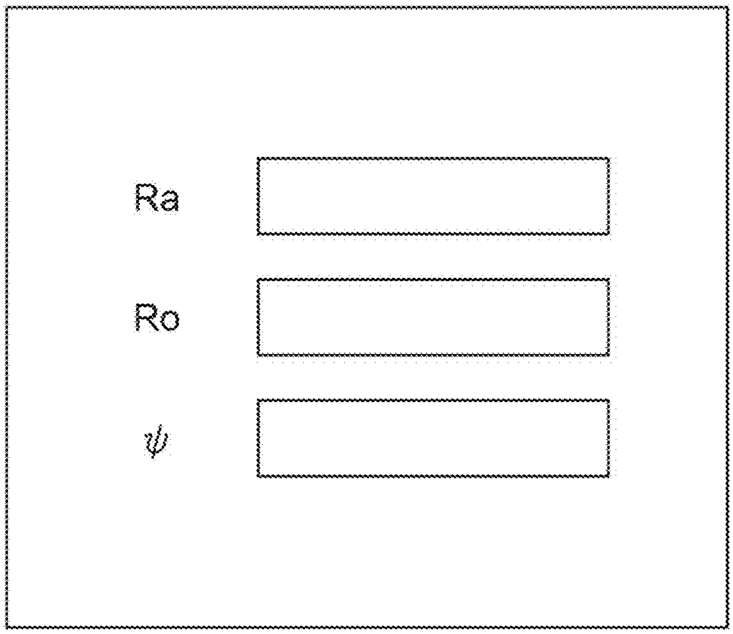
FIG. 8 is an example schematic diagram illustrating an input interface for an permissible range.

The posture check unit 112 may calculate the rotation angles around two axes representing the posture change of the end-effector 3 relative to the reference posture. For example, as shown in FIG. 7, the posture check unit 112 calculates, as parameters representing the posture change of the end-effector 3 relative to the reference posture, the angle $\psi$ of the k-axis passing through the origin in the XY plane with respect to the Y-axis, the rotation angle Ra of the Z-axis around the k-axis, and the rotation angle Ro around the rotated Z-axis. The range setting unit 134 may generate an input interface (see FIG. 8) that allows input of the permissible ranges of the angle ψ, the rotation angle Ra, and the rotation angle Ro, and set the respective permissible ranges of the angle ψ, the rotation angle Ra, and the rotation angle Ro based on the input to the input interface. The posture check unit 112 may check whether each of the calculated angle ψ, rotation angle Ra, and rotation angle Ro is within the preset permissible range. Note that the input interface in FIG. 8 is merely an example and may not be configured to directly specify the values of the permissible ranges of the angle ψ, the rotation angle Ra, and the rotation angle Ro. For example, the input interface may be configured to specify the permissible ranges of the angle ψ, the rotation angle Ra, and the rotation angle Ro by levels such as "Level 1," "Level 2," "Level 3," and so on. The range setting unit sets the respective permissible ranges of the angle ψ, the rotation angle Ra, and the rotation angle Ro based on the specified level and the permissible range assigned to each level.

Figure 9:
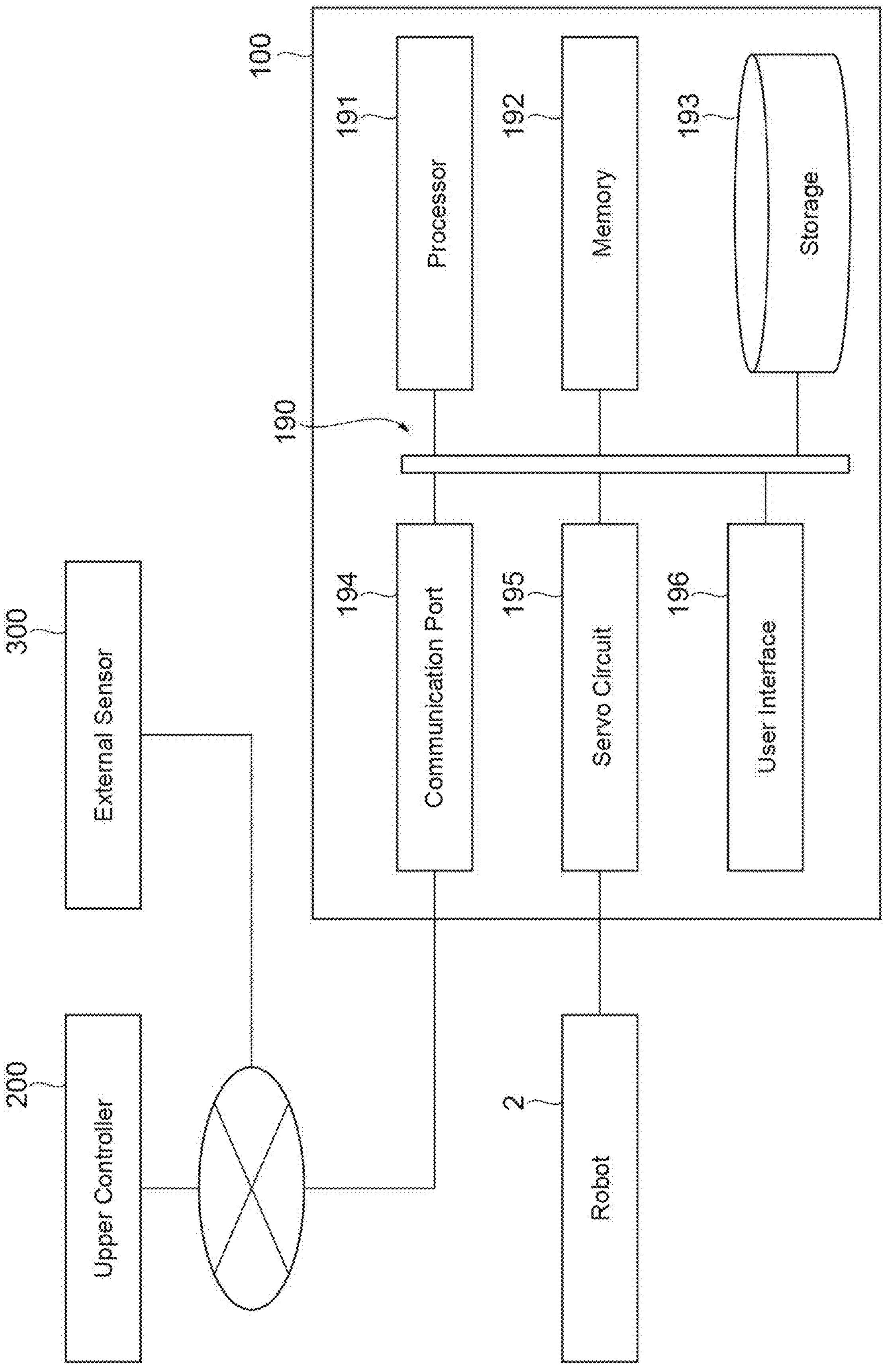
FIG. 9 is an example block diagram illustrating the hardware configuration of a controller.

FIG. 9 is a block diagram illustrating an example hardware configuration of the control device 100. As shown in FIG. 9, the control device 100 includes circuitry 190. The circuitry 190 includes a processor 191, a memory 192, a storage 193, a communication port 194, a servo circuit 195, and a user interface 196.

The storage 193 stores a program for causing the control device 100 to execute generating a motion path in the joint angle space of the multi-joint arm 10 while suppressing the posture change of the end-effector 3 when moving along the motion path, and operating the robot 2 so that the end-effector 3 moves along the generated motion path. For example, the storage 193 stores programs for configuring each of the above-mentioned functional blocks in the control device 100.

The storage 193 includes one or more storage devices. The storage devices are non-volatile storage media such as hard disk drives or flash memory, for example. The storage devices may include portable media such as optical disks, magnetic disks, and the like.

The memory 192 temporarily stores the programs loaded from the storage 193. The memory 192 includes one or more memory devices. The memory devices are volatile storage media such as random access memory, for example.

The processor 191 configures each of the above-mentioned functional blocks in the control device 100 by executing the programs loaded into the memory 192. Data generated by the processor 191 may also be stored in the memory 192. The processor 191 includes one or more processing devices. Examples of the processing devices include a CPU (Central Processing Unit), a GPU (Graphics Processing Unit), and the like.

The communication port 194 communicates with the host controller 200, or the external sensor 300, and the like by wired or wireless network communication upon request from the processor 191. The servo circuit 195 supplies current to the motors 41, 42, 43, 44, 45, and 46 based on requests from the processor 191.

The user interface 196 inputs and outputs information to and from a user who is a human upon request from the processor 191. For example, the user interface 196 includes one or more display devices and one or more input devices. Examples of the one or more display devices include an organic EL (Electro Luminescence) monitor, a liquid crystal monitor, and the like. Examples of the one or more input devices include a keyboard, a mouse, a keypad, a touchpad, and the like. Any of the one or more input devices may be integrated with any of the one or more display devices as a touch panel.

[Control Procedure]

As an example control method, a control procedure executed by the control device 100 will be described. This procedure includes generating a motion path of the robot 2 and operating the robot 2 so that the end-effector 3 moves along the generated motion path. Generating the motion path includes generating the motion path in the joint angle space of the multi-joint arm 10 while suppressing the posture change of the end-effector 3 when moving along the motion path.

As an example, this procedure includes a status update procedure, a command calling procedure, a path generation procedure, and a robot control procedure. Each procedure will be described below.

(Status Update Procedure)

Figure 10:
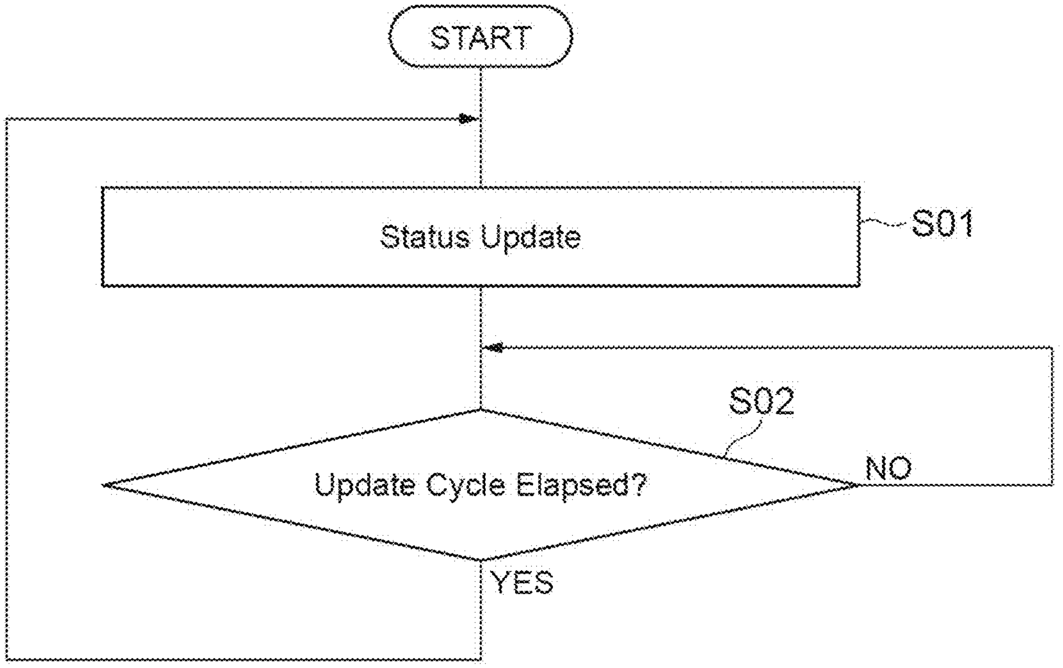
FIG. 10 is an example flowchart illustrating a status update procedure.

This procedure is a procedure to update the statuses of one or more machines that are surrounding objects of the robot 2. As shown in FIG. 10, the control device 100 executes operations S01 and S02. In operation S01, the status update unit 133 acquires status information of one or more machines from the host controller 200, the external sensor 300, and the like, and updates the status information stored in the status storage unit 132 with the acquired status information. In operation S02, the status update unit 133 waits for the elapse of a predetermined update cycle. Then, the control device 100 returns the process to operation S01. The control device 100 repeatedly executes the above procedure from the start to the completion of the control procedure.

(Command Calling Procedure)

Figure 11:
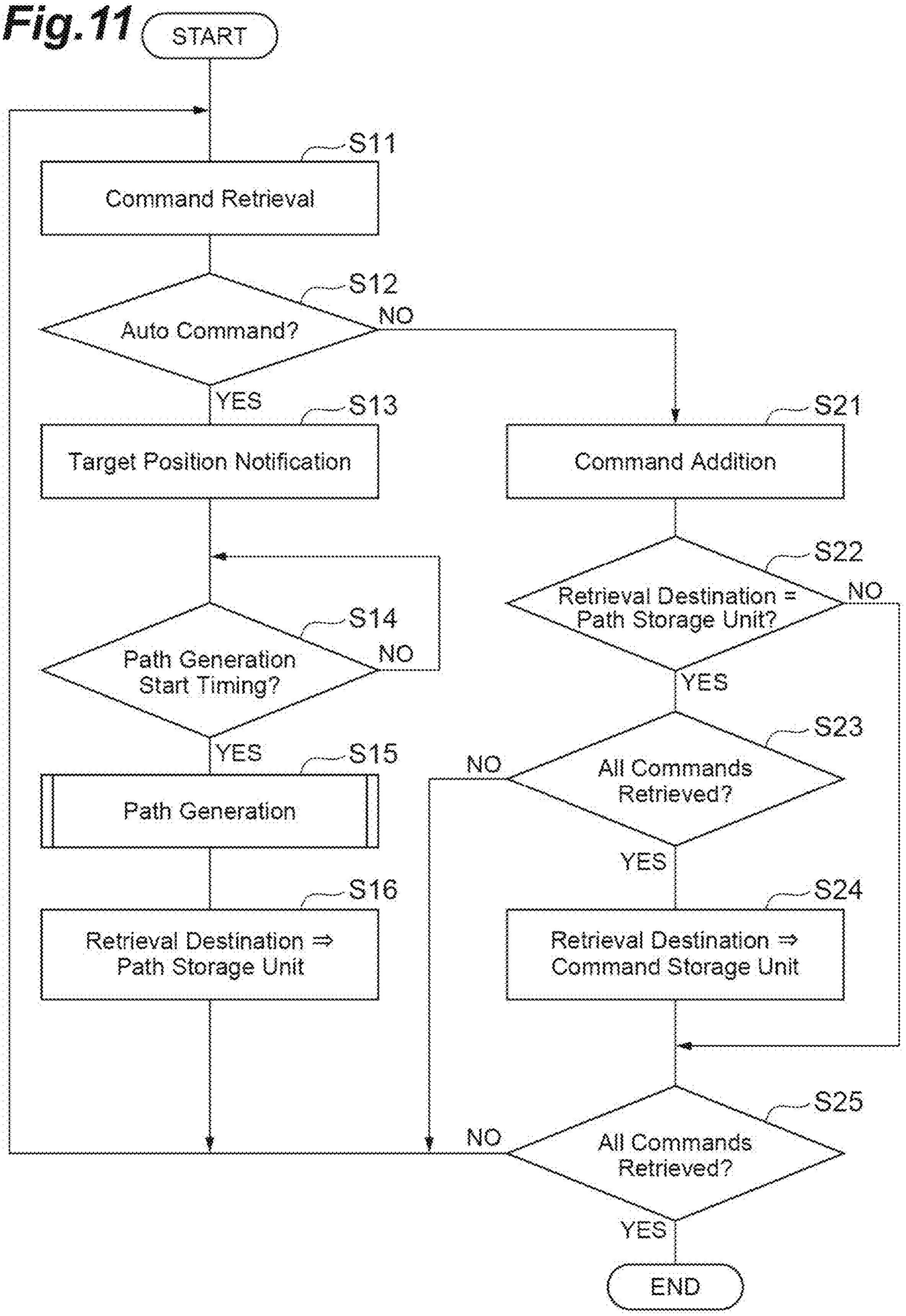
FIG. 11 is an example flowchart illustrating a command calling procedure.

This procedure is a procedure to sequentially call motion commands from the command storage unit 125 or the path storage unit 121. The calling source of the motion commands at the start of execution is the command storage unit 125. As shown in FIG. 11, the control device 100 first executes operations S11 and S12. In operation S11, the calling unit 122 calls one motion command from the calling source storage unit. In operation S12, the calling unit 122 checks whether the called motion command is an auto command.

If it is determined in operation S12 that the motion command is an auto command, the control device 100 executes operations S13, S14, S15, and S16. In operation S13, the calling unit 122 notifies the path generation unit 110 of the target position of the auto command and the target position of the motion command called immediately before the auto command (the above-mentioned previous target position). In operation S14, the path generation unit 110 waits for the start timing of the path generation (e.g., the above-mentioned start timing t2). In operation S15, the path generation unit 110 generates the air cut path. The procedure for generating the air cut path will be described later. In operation S16, the calling unit 122 changes the calling source of the motion commands from the command storage unit 125 to the path storage unit 121.

In operation S12, if it is determined that the motion command is not an auto command but a move command, the control device 100 executes operations S21 and S22. In operation S21, the calling unit 122 stores the called motion command in the buffer 123. In operation S22, the calling unit 122 checks whether the calling source of the motion commands is the path storage unit 121.

In operation S22, if it is determined that the calling source of the motion commands is the path storage unit 121, the control device 100 executes operation S23. In operation S23, the calling unit 122 checks whether the calling of all the motion commands stored in the path storage unit 121 has been completed. If it is determined in operation S23 that there are motion commands remaining in the path storage unit 121 that have not been called, the control device 100 returns the process to operation S11 and continues calling motion commands from the path storage unit 121.

If it is determined in operation S23 that the calling of all the motion commands stored in the path storage unit 121 has been completed, the control device 100 executes operation S24. In operation S24, the calling unit 122 changes the calling source of the motion commands from the path storage unit 121 to the command storage unit 125.

Next, the control device 100 executes operation S25. If it is determined in operation S22 that the calling source of the motion commands is the command storage unit 125, the control device 100 proceeds to operation S25 without executing operations S23 and S24. In operation S25, the calling unit 122 checks whether the calling of all the motion commands stored in the command storage unit 125 has been completed. In operation S25, if it is determined that there are motion commands remaining in the command storage unit 125 that have not been called, the control device 100 returns the process to operation S11 and continues calling motion commands from the command storage unit 125. In operation S25, if it is determined that the calling of all the motion commands stored in the command storage unit 125 has been completed, the control device 100 completes the calling of the motion commands.

Figure 12:
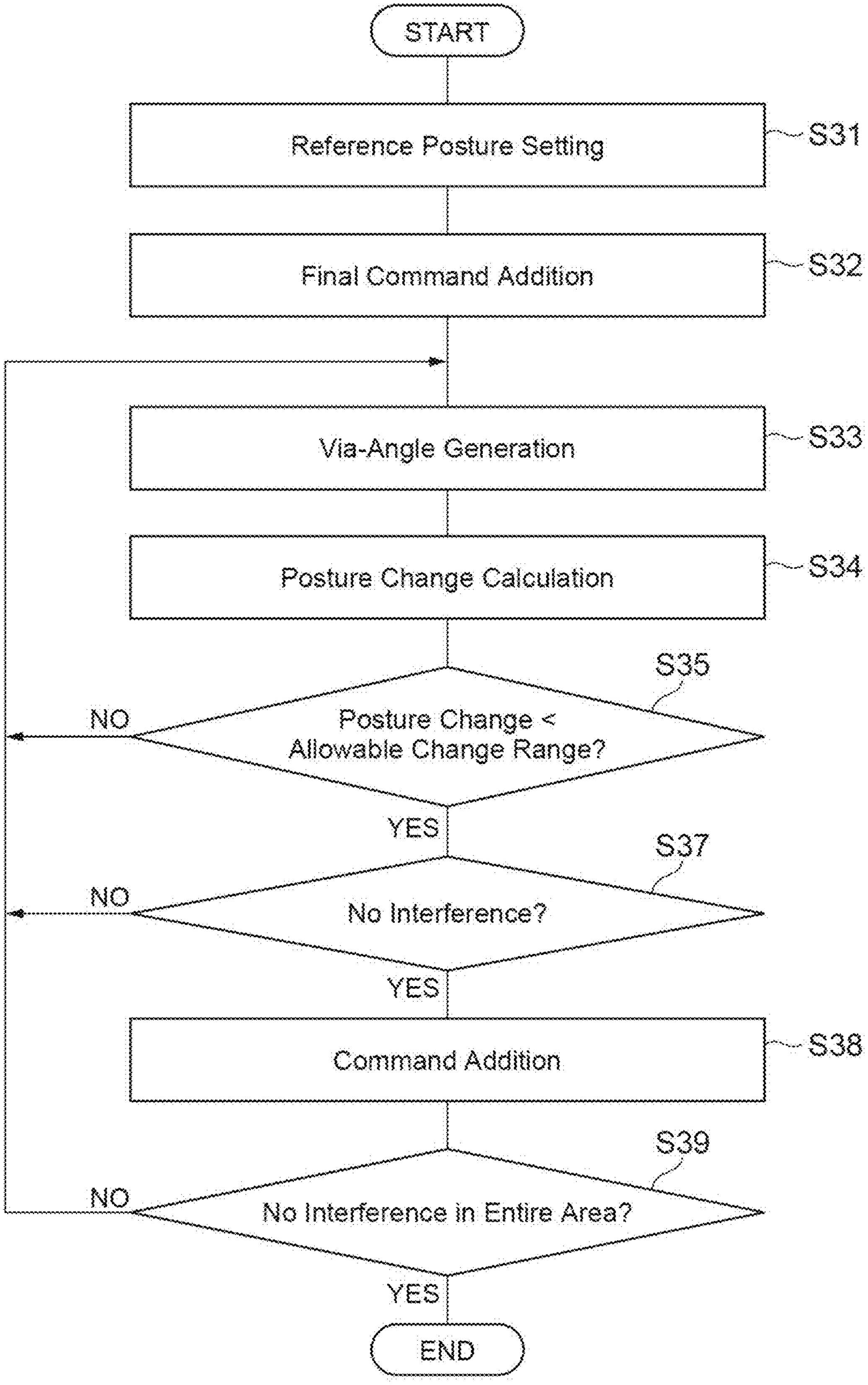
FIG. 12 is an example flowchart illustrating a path generation procedure.

FIG. 12 is an example flowchart illustrating the procedure for generating the air cut path in operation S15. As shown in FIG. 12, the control device 100 first executes operations S31, S32, S33, S34, and S35. In operation S31, the reference posture setting unit 116 sets the above-mentioned reference posture. In operation S32, the command addition unit 114 adds a move command corresponding to the end point of the air cut path to the path storage unit 121. In operation S33, the via angle generation unit 111 generates the above-mentioned via angles. In operation S34, the posture check unit 112 calculates the posture change of the end-effector 3 relative to the reference posture based on the via angles. In operation S35, the interference check unit 113 checks whether the posture change of the end-effector 3 falls within the predetermined permissible change range. If it is determined in operation S35 that the posture change is not within the permissible change range, the control device 100 returns the process to operation S33 to regenerate other via angles.

If it is determined in operation S35 that the posture change is within the permissible change range, the control device 100 executes operation S37. In operation S37, the interference check unit 113 simulates the posture of the robot 2 corresponding to the via angles in the virtual space based on the via angles and the model of the robot 2 stored in the model storage unit 131, and checks whether the robot 2 does not interfere with the surrounding objects at the via angles. If it is determined in operation S37 that the robot 2 interferes with the surrounding objects, the control device 100 returns the process to operation S33 to regenerate other via angles.

If it is determined in operation S37 that the robot 2 does not interfere with the surrounding objects, the control device 100 executes operations S38 and S39. In operation S38, the command addition unit 114 adds a move command to the path storage unit 121 with the via angles as the target angles. In operation S39, the interference check unit 113 simulates the operation of the robot 2 by the plurality of move commands added to the path storage unit 121 based on the model of the robot 2 stored in the model storage unit 131 and checks whether the robot 2 does not interfere with the surrounding objects throughout the entire range from the starting point to the end point of the air cut path. If it is determined in operation S39 that the robot 2 interferes with the surrounding objects, the control device 100 returns the process to operation S33 to regenerate additional via angles. If it is determined in operation S39 that the robot 2 does not interfere with the surrounding objects, the control device 100 completes the generation of the air cut path.

Instead of operation S31, the control device 100 may execute calculating the reference posture corresponding to the generated via angles as part of the posture trajectory each time the via angle generation unit 111 generates via angles in operation S33.

Figure 13:
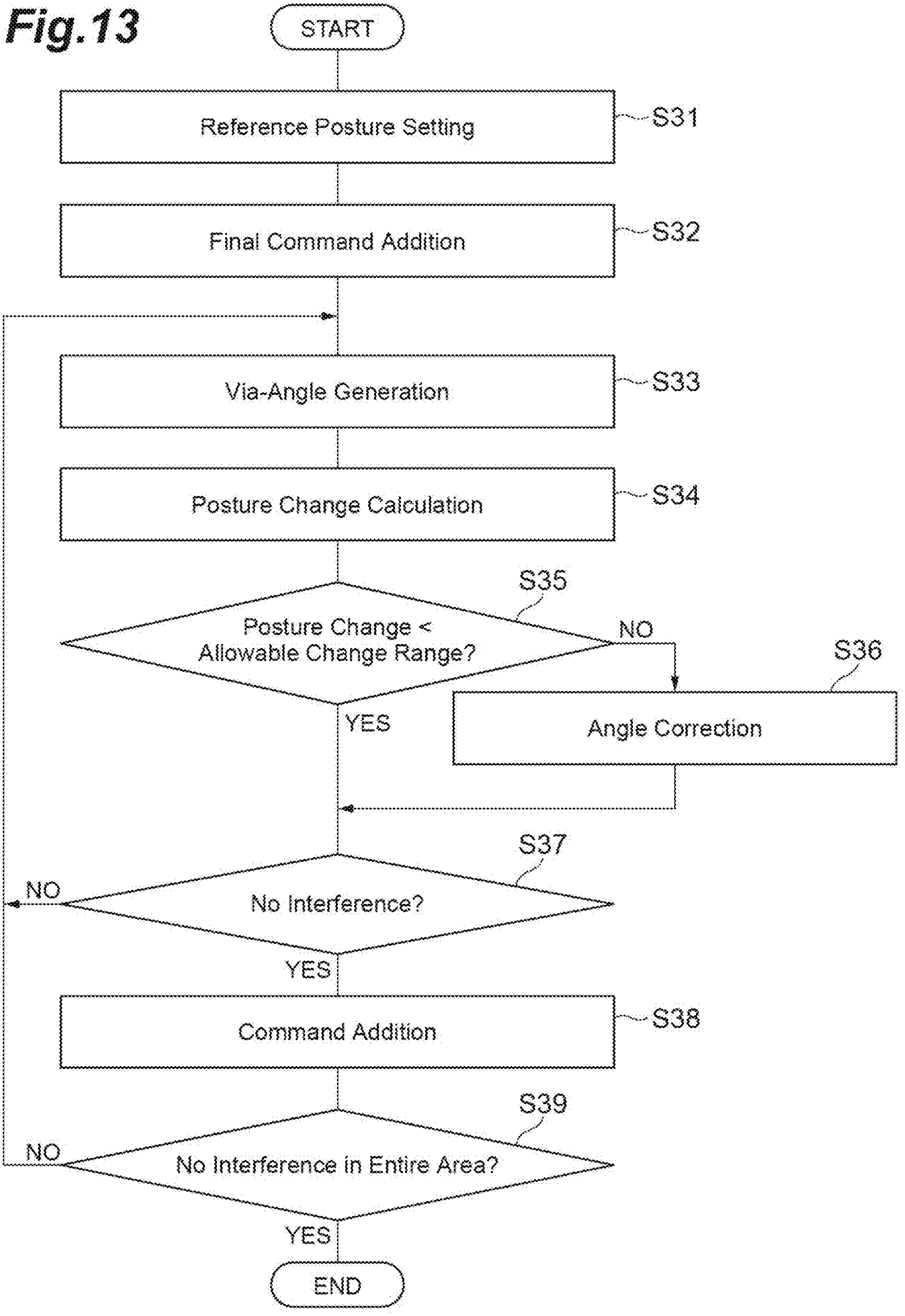
FIG. 13 is an example flowchart illustrating a modification of the path generation procedure.

As shown in FIG. 13, when it is determined in operation S35 that the posture change is not within the permissible change range, the control device 100 may execute operation S36. In operation S36, the angle correction unit 115 corrects the via angles so that the posture of the end-effector 3 falls within the permissible range. When operation S36 is executed, the interference check unit 113 in operation S37 performs interference check based on the via angles corrected by the angle correction unit 115.

(Robot Control Procedure)

Figure 14:
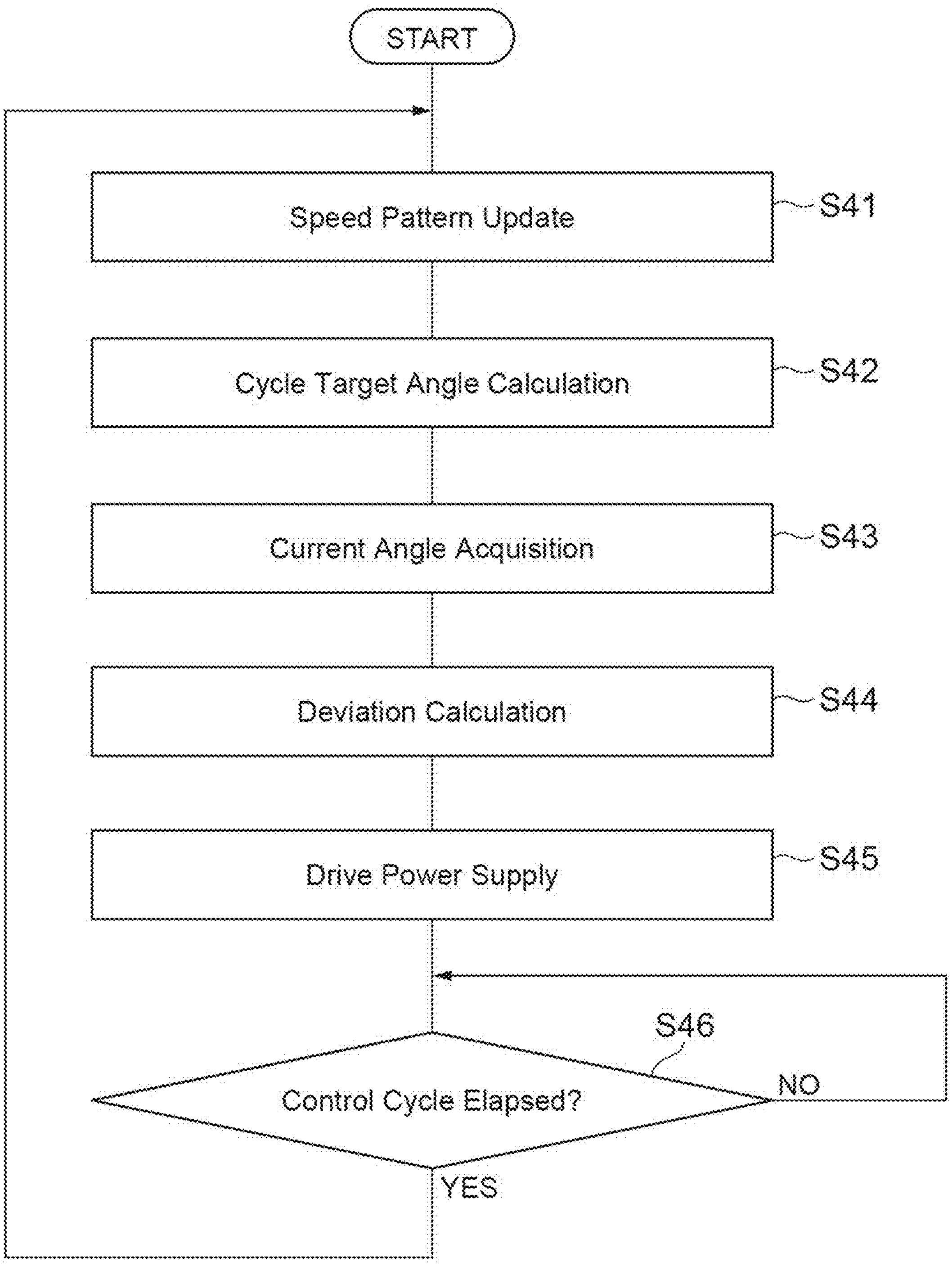
FIG. 14 is an example flowchart illustrating a robot control procedure.

This procedure operates the robot 2 based on the motion commands added to the buffer 123. As shown in FIG. 14, the control device 100 executes operations S41, S42, S43, S44, S45, and S46. In operation S41, the robot control unit 124 generates (updates) the velocity pattern including acceleration and deceleration based on the plurality of motion commands stored in the buffer 123. In operation S42, the robot control unit 124 calculates the target positions (target angles) of the motors 41, 42, 43, 44, 45, and 46 for each control cycle. In operation S43, the robot control unit 124 acquires the current positions (current angles) of the motors 41, 42, 43, 44, 45, and 46. In operation S44, the deviations between the target positions and the current positions are calculated. In operation S45, the robot control unit 124 calculates the drive power to reduce each of the deviations and supplies the calculated drive power to each of the motors 41, 42, 43, 44, 45, and 46. In operation S46, the robot control unit 124 waits for the elapse of the control cycle. Then, the control device 100 returns the process to operation S41. The control device 100 repeatedly executes the above procedure.

The embodiments described above include the following configuration.

(1) A robot system 1 including: a robot 2 having a multi-joint arm 10 configured to change the position of an end-effector; a path generation unit 110 configured to generate a motion path to move the end-effector; and a robot control unit 124 configured to operate the robot 2 so that the end-effector moves along the generated motion path; wherein the path generation unit 110 is configured to generate the motion path in a joint angle space of the multi-joint arm 10 while suppressing a posture change of the end-effector when moving along the motion path.

According to the method of generating a motion path in the joint angle space, it is easier to distribute the motion among the multiple joints compared to the method of generating a motion path using the Cartesian space. Therefore, any of the multiple joints may be prevented from performing an excessive motion and to generate the motion path of the robot 2 quickly with reliability. However, there is a possibility that the posture of the end-effector may change greatly during the operation of the robot 2 along the motion path. In a situation where the posture of the end-effector may not be changed, if the posture of the end-effector changes greatly, energy may be consumed. Also, for example, when the robot 2 is used to convey a container containing liquid, there may be cases where a great change in the posture of the end-effector cannot be allowed. In contrast, in this robot system 1, the path generation unit 110 generates the motion path in the joint angle space while suppressing the posture change of the end-effector. Therefore, the change in the posture of the end-effector may be suppressed while preventing any of the multiple joints may from performing an excessive motion. Accordingly, the motion path of the robot 2 may quickly be generated with reliability.

(2) The robot system 1 according to (1), wherein the path generation unit 110 is configured to generate at least a part of the motion path while the robot control unit 124 is operating the robot 2.

By generating the motion path at a timing close to the timing when the robot 2 actually operates, the motion path may be generated with reliability. In addition, by reducing the timing in which the operation of the robot 2 is interrupted to wait for the generation of the motion path, the robot 2 can be operated efficiently.

(3) The robot system 1 according to (2), further comprising a command storage unit 125 storing one or more motion commands including an auto command that includes a target position wherein the one or more motion commands are sequentially called; wherein when the auto command is called, the path generation unit 110 generates, as the motion path, an air cut path that moves the end-effector to the target position of the auto command.

Since the motion path of the robot 2 can be generated quickly with reliability, even if the motion path of the robot 2 is generated after the auto command is called, the increase in the period during which the operation of the robot 2 is interrupted to wait for the generation of the motion path can be suppressed. By generating the motion path of the robot 2 after the auto command is called, the motion path is generated at a timing close to the timing when the robot 2 actually operates, so the motion path adapted to changes in the surrounding environment may be generated with reliability.

(4) The robot system 1 according to (3), wherein range information representing an permissible range of posture change of the end-effector is associated with the auto command; and wherein the path generation unit 110 is configured to generate the motion path based on the range information corresponding to the called auto command so that the posture change of the end-effector falls within the permissible range represented by the range information.

The narrower the permissible range, the greater the computational load to generate the motion path. By associating the permissible range with the auto command, the permissible range may be changed according to the auto command. Therefore, suppressing the posture change of the end-effector and reducing the computational load may be balanced.

(5) The robot system 1 according to any one of (1) to (4), wherein the path generation unit 110 comprises: a via angle generation unit 111 configured to generate via angles through which joint angles of the multi-joint arm 10 pass from the joint angles corresponding to a starting point of the motion path to the joint angles corresponding to an end point of the motion path; and a posture check unit 112 configured to check whether the posture of the end-effector based on the via angles falls within a predetermined permissible range; and wherein the path generation unit 110 is configured to generate the motion path based on the via angles in which the posture of the end-effector falls within the permissible range.

By checking whether the posture is within the permissible range after calculating the via angles, the posture change of the end-effector may readily be suppressed even in the joint angle space.

(6) The robot system 1 according to (5), wherein the path generation unit 110 further comprises an interference check unit 113 configured to check whether the robot 2 interferes with surrounding objects at the via angles where the posture of the end-effector falls within the permissible range based on models of the robot 2 and the surrounding objects; and wherein the path generation unit 110 is configured to generate the motion path based on the via angles where the robot 2 does not interfere with the surrounding objects.

By limiting the target of interference check to the via angles where the posture of the end-effector is within the permissible range and suppressing the computational load, the generation of the motion path may be sped up.

(7) The robot system 1 according to (6), wherein the path generation unit 110 further comprises an angle correction unit 115 configured to correct the via angles so that the posture of the end-effector falls within the permissible range when the posture of the end-effector based on the via angles does not fall within the permissible range.

By correcting and utilizing the via angles where the posture of the end-effector did not fall within the permissible range without discarding them, the computational load can be further reduced.

(8) The robot system 1 according to any one of (1) to (7), wherein the path generation unit 110 is configured to suppress the posture change with respect to a posture trajectory from the posture of the end-effector corresponding to a starting point of the motion path to the posture of the end-effector corresponding to an end point of the motion path.

The posture of the end-effector may gradually be transitioned from the posture of the end-effector at the starting point to the posture of the end-effector at the end point while suppressing the posture change.

(9) The robot system 1 according to any one of (1) to (7), wherein the path generation unit 110 is configured to suppress the posture change so that the posture change falls within an permissible range including at least one of the posture of the end-effector at a starting point of the motion path and the posture of the end-effector at an end point of the motion path. By suppressing the posture change with respect to at least one of the posture of the end-effector at the starting point and the posture of the end-effector at the end point, the posture change of the end-effector can be further suppressed.

(10) The robot system 1 according to (9), wherein the path generation unit 110 is configured to suppress the posture change so that the posture change falls within the permissible range including both the posture of the end-effector at the starting point and the posture of the end-effector at the end point.

By providing a reasonable width to the permissible range, suppressing the posture change of the end-effector and reducing the computational load may be balanced.

(11) The robot system 1 according to any one of (1) to (10), further comprising a range setting unit 134 configured to set the permissible range of the posture change based on input by a user; wherein the path generation unit 110 is configured to suppress the posture change so that it falls within the permissible range.

By allowing customization of the permissible range of the posture change, usability can be improved.

(12) The robot system 1 according to (11), wherein the range setting unit 134 is configured to acquire the permissible range represented by a two-axis rotation method based on input by the user; and wherein the path generation unit 110 is configured to calculate the posture change by the two-axis rotation method and generates the motion path so that the calculated posture change falls within the permissible range.

By enabling intuitive designation of the permissible range, usability can be further improved.

(13) A control method for controlling a robot 2 having a multi-joint arm 10 that changes a position of an end-effector, including: generating a motion path of the robot 2; and operating the robot 2 so that the end-effector moves along the generated motion path; wherein generating the motion path includes generating the motion path in a joint angle space of the multi-joint arm 10 while suppressing a posture change of the end-effector when moving along the motion path.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A robot system comprising:

a robot having a multi-joint arm connected to an end-effector; and circuitry configured to:

generate a set of joint angles of the multi-joint arm in a joint angle space having dimensions respectively corresponding to the set of joint angles without being constrained by a target posture of the end-effector in a Cartesian space;

calculate a posture of the end-effector by forward kinematics based on the set of joint angles generated in the joint angle space;

check whether the calculated posture of the end-effector falls within a predetermined permissible range of change of posture of the end-effector compared to a predetermined reference posture;

generate a motion path by selecting the set of joint angles in response to determining that the calculated posture of the end-effector falls within the predetermined permissible range, so that the change of posture of the end-effector moving along the motion path is reduced; and control the robot to move the end-effector along the generated motion path.

2. The robot system according to claim 1, wherein the circuitry is configured to generate at least a part of the motion path while operating the robot.

3. The robot system according to claim 1, wherein the circuitry is configured to generate at least a part of the motion path while the robot moves the end-effector.

4. The robot system according to claim 1, wherein the circuitry is further configured to:

sequentially call multiple motion commands to control the robot, the multiple motion commands including:

a move command that includes a predetermined motion path; and an auto command that includes a target position;

control, in response to calling the move command, the robot to move the end-effector along the predetermined motion path; and generate, in response to calling the auto command, the motion path for moving the end-effector to the target position of the auto command.

5. The robot system according to claim 1, wherein the circuitry is further configured to:

sequentially call one or more motion commands to control the robot, the one or more motion commands including an auto command that includes a target position, wherein range information representing the predetermined permissible range of the change of posture is associated with the auto command; and generate, in response to calling the auto command, the motion path for moving the end-effector to the target position of the auto command based on the range information corresponding to the called auto command so that the change of posture falls within the predetermined permissible range represented by the range information.

6. The robot system according to claim 1, wherein the circuitry is further configured to:

check, based on models of the robot and an object in an environment surrounding the robot, whether the robot interferes with the object at the set of joint angles, after checking whether the calculated posture of the end-effector falls within the predetermined permissible range;

modify the set of joint angles without checking whether the robot interferes with the object at the set of joint angles in response to determining that the calculated posture of the end-effector does not fall within the predetermined permissible range; and generate the motion path by selecting the set of joint angles in response to determining that the calculated posture of the end-effector falls within the predetermined permissible range and the robot does not interfere with the object at the set of joint angles.

7. The robot system according to claim 1, wherein the circuitry is further configured to:

check, based on models of the robot and an object in an environment surrounding the robot, whether the robot interferes with the object at the set of joint angles:

partially correct the set of joint angles so that the calculated posture of the end-effector falls within the predetermined permissible range in response to determining that the calculated posture of the end-effector does not fall within the predetermined permissible range; and generate the motion path by selecting the set of joint angles in response to determining that the calculated posture of the end-effector falls within the predetermined permissible range and the robot does not interfere with the object at the set of joint angles.

8. The robot system according to claim 1, wherein the circuitry is further configured to:

check, based on models of the robot and an object in an environment surrounding the robot, whether the robot interferes with the surrounding object at the set of joint angles, after checking whether the calculated posture of the end-effector falls within the predetermined permissible range;

partially correct the set of joint angles so that the calculated posture of the end-effector falls within the predetermined permissible range in response to determining that the calculated posture of the end-effector does not fall within the predetermined permissible range, before checking whether the robot interferes with the object at the set of joint angles;

check whether the robot interferes with the object at the corrected set of joint angles; and generate the motion path by selecting the set of joint angles in response to determining that the calculated posture of the end-effector falls within the predetermined permissible range and the robot does not interfere with the object at the set of joint angles.

9. The robot system according to claim 1, wherein the circuitry is configured to:

generate the motion path from a predetermined starting posture of the end-effector to a predetermined end posture of the end-effector; and generate the motion path to reduce the change of posture from a posture trajectory that is determined to gradually change from the starting posture to the end posture.

10. The robot system according to claim 1, wherein the circuitry is configured to:

generate the motion path from a predetermined starting posture of the end-effector to a predetermined end posture of the end-effector; and generate the motion path so that the calculated posture of the end-effector falls within the predetermined permissible range including the starting posture or the end posture.

11. The robot system according to claim 1, wherein the circuitry is configured to:

generate the motion path from a predetermined starting posture of the end-effector to a predetermined end posture of the end-effector; and generate the motion path so that the calculated posture of the end-effector falls within the predetermined permissible range including both the starting posture and the end posture.

12. The robot system according to claim 1, wherein the circuitry is further configured to:

set the predetermined permissible range of the change of posture based on a user input; and generate the motion path so that the change of posture from the predetermined reference posture falls within the predetermined permissible range.

13. The robot system according to claim 12, wherein the circuitry is configured to:

acquire the predetermined permissible range represented by a two-axis rotation method based on the user input;

calculate the change of posture from the predetermined reference posture by the two-axis rotation method; and modify the motion path so that the calculated change of posture falls within the predetermined permissible range.

14. A control method for controlling a robot having a multi-joint arm connected to an end-effector, comprising:

generating a set of joint angles of the multi-joint arm in a joint angle space having dimensions respectively corresponding to the set of joint angles;

calculating a posture of the end-effector by forward kinematics based on the set of joint angles generated in the joint angle space;

checking whether the calculated posture of the end-effector falls within a predetermined permissible range of change of posture of the end-effector compared to a predetermined reference posture;

generating a motion path by selecting the set of joint angles in response to determining that the calculated posture of the end-effector falls within the predetermined permissible range, so that the change of posture of the end-effector moving along the motion path is reduced; and controlling the robot to move the end-effector along the generated motion path.

15. The control method according to claim 14, wherein at least a part of the motion path is generated while the robot is operated.

16. The control method according to claim 14, further comprising sequentially calling one or more motion commands to control the robot, the one or more motion commands including an auto command that includes a target position, wherein the motion path is generated, in response to calling the auto command, for moving the end-effector to the target position of the auto command.

17. The control method according to claim 16, wherein range information representing the predetermined permissible range of the change of posture of the end-effector is associated with the auto command, and wherein the motion path is generated based on the range information corresponding to the called auto command so that the change of posture of the end-effector falls within the predetermined permissible range represented by the range information.

18. The control method according to claim 14, further comprising:

sequentially calling one or more motion commands to control the robot, the one or more motion commands including an auto command that includes a target position; and generating, in response to calling the auto command, the motion path for moving the end-effector to the target position of the auto command, wherein range information representing the predetermined permissible range of the change of posture is associated with the auto command, and wherein the motion path is generated based on the range information corresponding to the called auto command so that the change of posture falls within the predetermined permissible range represented by the range information.

19. The control method according to claim 14, further comprising:

checking, based on models of the robot and an object in an environment surrounding the robot, whether the robot interferes with the object at the set of joint angles, after checking whether the calculated posture of the end-effector falls within the predetermined permissible range; and modifying the set of joint angles without checking whether the robot interferes with the object at the set of joint angles in response to determining that the calculated posture of the end-effector does not fall within the predetermined permissible range, wherein generating the motion path includes generating the motion path by selecting the set of joint angles in response to determining that the calculated posture of the end-effector falls within the predetermined permissible range and the robot does not interfere with the object at the set of joint angles.

* * * * *